United States Patent [19]
Yamamoto

[11] Patent Number: 5,731,919
[45] Date of Patent: Mar. 24, 1998

[54] OPTICAL APPARATUS

[75] Inventor: Haruhisa Yamamoto, Fujisawa, Japan

[73] Assignee: Canon Kabushiki Kaisha, Tokyo, Japan

[21] Appl. No.: 745,842

[22] Filed: Nov. 12, 1996

[30] Foreign Application Priority Data

Nov. 13, 1995 [JP] Japan .................................. 7-319556

[51] Int. Cl.$^6$ ....................................................... G02B 7/02
[52] U.S. Cl. ........................ 359/824; 359/823; 359/825; 359/696; 396/133
[58] Field of Search ........................ 359/823, 824, 359/825, 696, 698, 694; 396/85, 133; 310/323, 317

[56] References Cited

U.S. PATENT DOCUMENTS

| | | |
|---|---|---|
| 4,553,817 | 11/1985 | Ando et al. ............................ 359/825 |
| 4,793,689 | 12/1988 | Aoyagi et al. ........................ 359/825 |
| 4,963,000 | 10/1990 | Kawai .................................. 359/824 |
| 5,198,935 | 3/1993 | Imanari et al. ....................... 359/698 |
| 5,282,090 | 1/1994 | Suzuki et al. ........................ 359/696 |
| 5,335,115 | 8/1994 | Kawai et al. ......................... 359/696 |
| 5,448,328 | 9/1995 | Suzuki et al. ........................ 396/133 |
| 5,453,807 | 9/1995 | Iizuka .................................. 396/133 |
| 5,572,373 | 11/1996 | Imanari et al. ....................... 359/825 |

*Primary Examiner*—Loha Ben
*Attorney, Agent, or Firm*—Fitzpatrick, Cella, Harper & Scinto

[57] ABSTRACT

An optical apparatus has an optical lens unit, a manual operation device for manually operating the optical lens unit, and a drive device for driving the optical unit by electrical power, in which the manual operation device and the drive device are coupled by magnetic force, in which when driven by the drive device, the optical lens is driven as the two devices are coupled, and in which when the manual operation device is operated manually, the optical lens is driven as the drive device is fixed.

6 Claims, 5 Drawing Sheets

५,७३१,९१९

OPTICAL APPARATUS

BACKGROUND OF THE INVENTION

1. Field of the Invention

The present invention relates to an optical apparatus, and more particularly, the invention is suitably applicable to an electrical power transmission mechanism for moving a lens unit in a taking lens used in television photographing or the like, for focusing or zooming.

2. Related Background Art

In the conventional optical apparatus, such as the taking lens used for television photographing or the like, a predetermined optical means is driven by driving force in order to achieve zooming (change of magnification), focusing, iris adjustment, attachment or detachment of filter, and the like.

With an example of the taking lens for television photographing, drive of the lens unit is effected by rotationally driving an operation ring disposed on the exterior surface of the lens unit and interlocked with the lens unit. A photographer drives the operation ring by hand or by electrical power depending upon photographing circumstances. For electrical power-driving the operation ring, a drive unit is provided in a part of a lens barrel.

The drive unit incorporates various switches, an electrical power motor, and an electrical power transmission mechanism for interconnecting the electrical power motor with the operation ring of the lens barrel. The drive unit is configured to actuate the electrical power motor with switch operation of photographer, whereby the operation ring is driven through the electrical power transmission mechanism. For manually driving a predetermined lens unit, the photographer directly rotates the operation ring by hand or operates a lever attached on the operation ring to rotationally drive it.

Since the operation ring of the taking lens is driven in the two methods of manual operation and electrical power operation as described above, the electrical power transmission mechanism in the drive unit is arranged to be selectively switchable depending upon the two operation modes.

FIG. 5 is a drawing to show the appearance of a conventional taking lens. FIG. 6 and FIG. 7 are explanatory drawings to show enlarged parts of FIG. 5. In the drawings, numeral 30 denotes a lens body, 31 a drive unit, 32 a focus ring, 33 a zoom ring, and 34 an iris ring.

Next explained is the electrical power transmission mechanism of the taking lens shown in FIGS. 5, 6 and 7. FIG. 6 shows an electrical power transmission path where a predetermined lens unit is driven by the electrical power motor constituting the drive unit 31. The elements other than the lens barrel and operation ring are built in the drive unit 31.

Numeral 35 designates the operation ring for lens drive, and working teeth 35a are provided circumferentially on the peripheral surface of the operation ring 35. Numeral 46 represents the electrical power motor, and numeral 36 represents a speed change gear, which is integrally installed with the electrical power motor 46. A sleeve 38 is fixed by pin 39 to an output shaft 37 of the speed change gear 36, so that the sleeve 38 can rotate together with the output shaft 37 of the change gear 36. Numeral 40 designates an output gear of the change gear 36, which is attached so as to be rotatable relative to the sleeve 38 and which is urged through a slide washer 41 by a spring 42.

This structure plays such a role of torque limiter that the output gear 40 of the change gear 36 and the output shaft 37 of the change gear 36 rotate together under predetermined load torque, but with overload torque, the sleeve 38 fixed to the output shaft 37 of the change gear 36 slips relative to the output gear 40, thereby relieving force acting on the tooth surface so as to prevent chipping of tooth. This torque limiter mechanism demonstrates its effect to absorb impact force exerted on the tooth surface upon stop, especially, when the lens unit is driven at high speed to the operation end.

Numeral 43 designates an intermediate gear located midway between the output gear 40 of the change gear 36 and the operation ring 35, which is rotatable relative to the shaft 44 and slidable on the shaft 44. Working teeth 43a provided on the peripheral surface of the intermediate gear 43 are meshed with both the output gear 40 of the change gear 36 and the working teeth 35a of the operation ring 35.

Under the electrical power transmission mechanism arranged as described, when the photographer operates a predetermined operation switch provided in the drive unit, the rotational power generated from the drive motor 46 is transmitted through the output gear 40 of the change gear 36 and the intermediate gear 43 to the operation ring 35, thereby electrical power-driving the lens unit interlocked therewith.

FIG. 7 is a drawing to show the mechanism when the lens operation ring 35 is driven manually. In this case, the photographer operates a clutch (switch) lever (not shown) so as to pivot a clutch plate 45. Since a switch pin 46 attached to the clutch plate 45 engages with the intermediate gear 43 as shown in FIG. 6, the intermediate gear 43 slides to the left on the shaft 44 with operation of the clutch lever, thereby departing from meshing with the output gear of the change gear 36. For manually operating the lens unit, the switch lever is operated in this manner to interrupt the electrical power transmission path from the electrical power motor 46, and the operation ring 35 is operated manually or the lever attached on the operation ring 35 is operated manually, thereby driving the lens unit.

For selectively switching the power drive to the manual drive and vice versa to drive the lens unit in this way, the method employed is the one to displace the position of the intermediate gear 43 located between the output gear 37 of the change gear 36 and the operation ring 35 and meshing the both, so as to make the working teeth thereof engage with or disengage from them. The working teeth at this time are normally provided on the outer peripheral surface as typified by a spur gear.

Further, the electrical power transmission member for transmitting the electrical power by meshing of teeth and the torque limiter member for preventing chipping of tooth surface by limiting the transmission torque upon overload rotation are independently provided as separate members in the electrical power transmission mechanism for interlocking the drive motor with the operation ring of lens unit.

The optical apparatus having the conventional electrical power transmission mechanism shown in FIGS. 5, 6 and 7 had the following problems. When the predetermined lens unit in the taking lens having the electrical power transmission mechanism is driven by electrical power, the intermediate gear located between the output gear of motor and the operation ring is meshing with the two gears, i.e., with the output gear from the motor and the operation ring.

Backlash usually exists in meshing portions of gear, and thus, a time lag occurs before the operation ring starts being driven after the start of motor driving. When the motor is driven at high speed to rotate the operation ring in a moment, the time lag at this time will not cause a big problem in practical use. However, upon slow zooming to drive the motor at low speed or upon fine feed, the time lag after the photographer issues a command to drive the lens unit and before start of operation of lens unit would be a big problem, which was a drawback of failing to obtain a photographing screen according to a photographic purpose of the photographer.

Therefore, it is desired to restrict the backlash of the gear train from the motor to the operation ring as much as possible to drive the lens unit. In addition, since the torque limiter member for limiting the transmission torque upon overload rotation and the electrical power transmission member for transmitting the electrical power by meshing of gears were arranged as separate members independently around the lens barrel, many components were necessitated and they occupied a large room in the drive unit, which made the drive unit complex and which was a hindrance against decrease of size and cost.

SUMMARY OF THE INVENTION

An object of the present invention is thus to provide an optical apparatus or a lens barrel which, in driving the operation ring manually so as to drive an optical means held in a housing or in driving it using the electrical power transmission mechanism to transmit rotational power generated in the electrical power motor to the optical means, decreases the backlash by properly arranging the electrical power transmission mechanism, decreases the time lag before start of operation of lens unit, and simplifies the structure of the torque limiter mechanism for limiting the transmission torque upon overload rotation, thereby simplifying the entire apparatus and making it more compact.

The present invention is characterized by an optical apparatus comprising an optical lens unit, manual operation means for operating the optical lens unit manually, and drive means for driving the optical unit by electrical power, wherein the manual operation means and the drive means are coupled with each other by magnetic force, wherein when driven by the drive means, the optical lens is driven as the two means are coupled, and wherein when the manual operation means is operated manually, the optical lens is driven as the drive means is fixed.

DETAILED DESCRIPTION OF THE PREFERRED EMBODIMENTS

Figure 1:
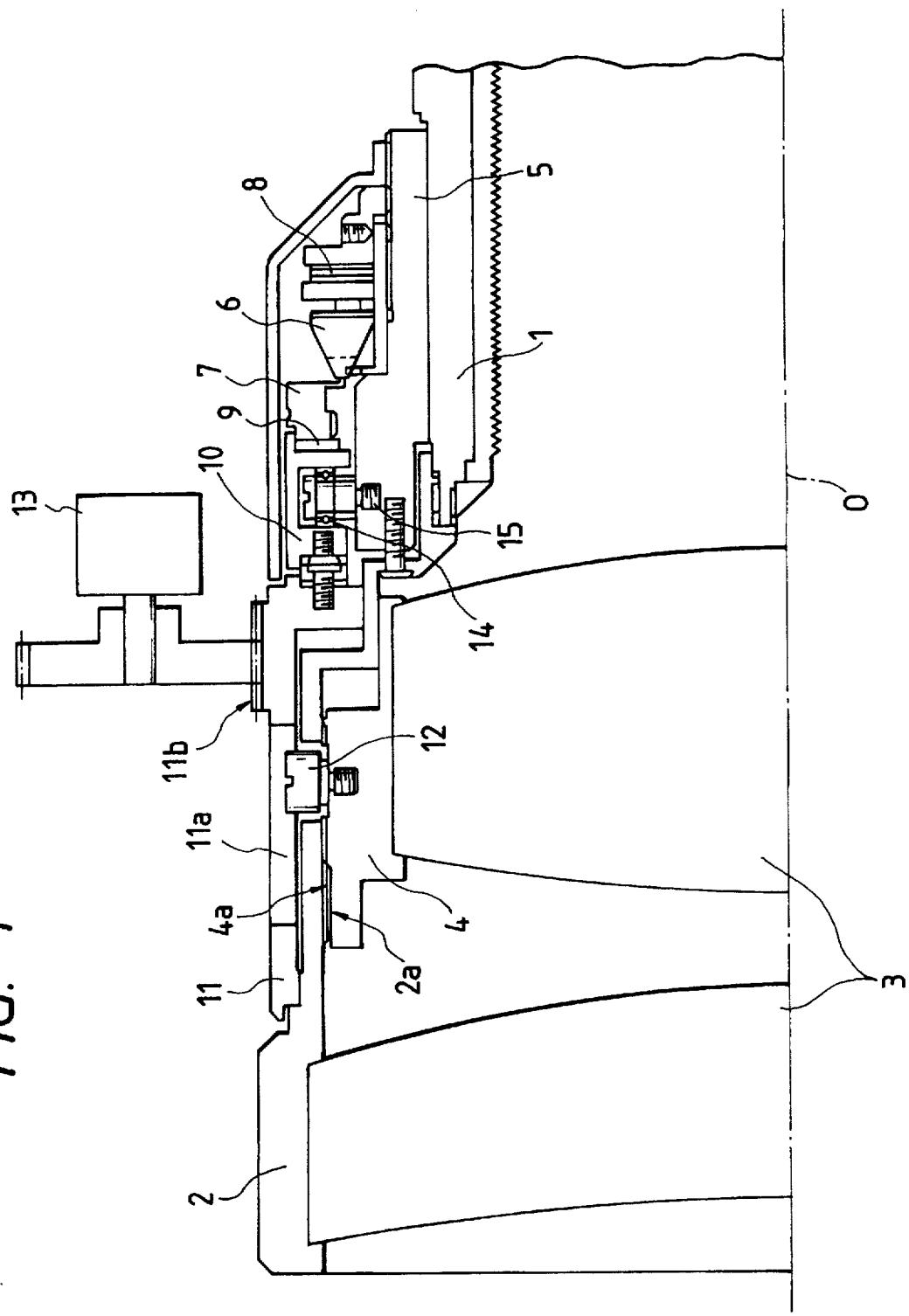
FIG. 1 is a major sectional view of Embodiment 1 of the present invention.
Figure 2:
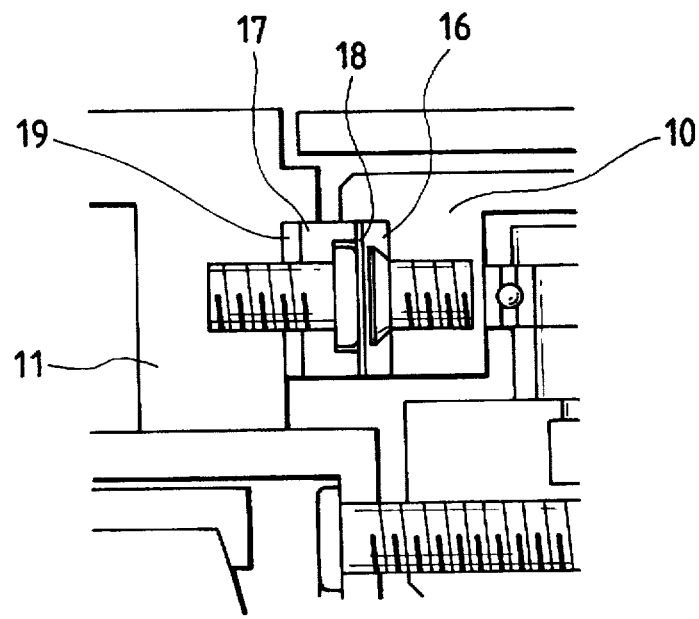
FIG. 2 is an enlarged explanatory drawing of a part of FIG. 1.

FIG. 1 is a major cross-sectional view of Embodiment 1 of the present invention. FIG. 2 is an enlarged explanatory drawing of a part of FIG. 1. In the drawings, reference numeral 1 designates a lens base (fixed lens barrel), and 2 a base barrel which is provided on the outer periphery thereof with a helicoid screw thread 2a helicoidally coupled with a focusing manual ring (operation ring) 11 as a manual operation means manually driven and which is integrally attached to the lens base 1 by screw. Numeral 3 denotes a focus lens having the optical axis 0, and 4 a focus lens barrel which holds the focus lens 3 and which is provided on the outer periphery thereof with a helicoid screw thread 4a meshed with the helicoid thread 2a of the base barrel 2. Further, a connecting pin 12 is inserted in the focus lens barrel 4.

Numeral 5 represents a drive unit base. Numeral 6 is a stator, and 7 a rotor which, together with the stator 6, Generates turning force of an oscillatory-wave motor. Each of the stator 6 and rotor 7 constitutes an element of drive means. Numeral 8 stands for a belleville spring, which generates appropriate frictional force between the stator 6 and the rotor 7. Numeral 9 is a buffer rubber, which prevents vibration of rotor 7 from being transmitted to the drive transmission system.

Numeral 10 is an output tube and 11 a manual ring for focus as a manual operation means which has fitting portions to the base barrel 2 and to the output tube 10 and which is arranged to rotate about the optical axis 0. When the photographer performs the manual operation, he rotates this manual ring 11. A straight line groove 11a is cut in the direction along the optical axis in the manual ring.

Numeral 12 is the connecting pin, which is for transmitting the turning force of the manual ring 11 to the focus barrel 4. The connecting pin 12 is attached to the focus barrel 4 and is fit in the straight-line cam groove 11a provided in the manual ring 11. The focus barrel 4 is arranged to move on a smooth basis in the direction of the optical axis through the helicoid screw threads 2a, 4a with rotation of the manual ring 11 by hand or by electrical power.

Numeral 13 designates an encoder or POT as a position sensor, which is connected through a gear 11b to the manual ring 11. Numeral 14 denotes bearings, which are for preventing the urging force of the belleville spring 8 from affecting the transmission system and which are disposed at three positions spaced 120° from each other about the optical axis. Numeral 15 represents bearing shafts which support the bearings 14 and which are attached to the drive unit base 5.

Numeral 16, shown in FIG. 2, denotes a magnetic member (a first thin plate) which is comprised of a thin plate (near t=0.5 thick) of Fe-Cr-Co-based, semirigid, permanent magnet and which is attached to the output tube 10 by screw. Numeral 17 stands for a resin magnet (a magnetic member which is a second thin plate) facing the magnetic thin plate 16 and having attractive force to each other, which is comprised of a ferrite-based and polyamide-based thin plate (near t=1.5 thick).

Numeral 18 is a spacer, which is a polyamide-based spacer and which is bonded to the resin magnet 17. The spacer 18 is comprised of a thin plate (near t=0.1 thick) for keeping constant the space between the thin plate 16 of magnet and the resin magnet 17, for generating friction torque by sliding, and for determining hysteresis torque. Numeral 19 is a yoke plate, which is a thin plate (near t=0.5 thick) of SECC-C20 (a galvanized steel plate, zincoat), which is for forming a magnetic circuit, and which is attached to the focusing manual ring 11 together with the resin magnet 17 by screw.

Here, the stator 6 attached to the drive unit base 5, rotor 7, belleville spring 8 for generation of friction, buffer rubber 9, and output tube 10 compose the drive means utilizing the oscillatory wave.

In the present embodiment the magnet thin plate 16 for transmitting the driving force from the drive means (stator 6, rotor 7), the resin spacer 18 for restricting the space between the thin plate 16 and the resin magnet 17, the resin magnet 17, and the yoke plate 19 compose respective elements of magnetic coupling means. The thin plate 16 and resin magnet 17 compose a magnetic force generating means for generating magnetic force.

The magnetic coupling means is configured to slip between the thin plate 16 and the spacer 18 with application of load torque greater than the predetermined load torque. The thin plate 16, magnet 17, spacer 18, yoke plate 19, etc. constituting the magnetic coupling means are formed in a ring shape (an annular shape) extending in the circumferential direction of the housing and are disposed on the periphery of the fixed barrel 1 about the optical axis. This configuration effectively uses the space and reduce the size of the entire apparatus. Further, the system of magnetic coupling means is of direct connection, which prevents occurrence of vibration or delay due to backlash or the like.

Next explained is the driving principle of an ultrasonic motor utilizing the oscillatory wave, employed in the present embodiment. The technology related to this case is disclosed in U.S. Pat. No. 4,793,689. The basic structure of drive transmission by the ultrasonic motor is configured by two ring-shaped members, one being the stator 6 to the bottom surface of which a piezo-electric ceramic member (having the property to expand or contract in one direction with application of voltage) is bonded, the top portion of which has projections arranged at extremely regular intervals, and a cross section of which is trapezoid and the other being the rotor 7 which is a ring having a flange shape with spring property in the contact portion with the stator 6 and which is urged against the stator 6 by certain force.

In the present embodiment oscillation is generated in the surface of stator 6 being an elastic body, and by the oscillation energy the rotor 7 being a moving body kept in press contact with the stator 6 is rotated continuously. This driving means is characterized in that the structure is very simple, responsivity and controllability of start and stop are high, operating sound is very low, and retention torque (to keep the rotor in a braked state upon stop) is large.

The belleville spring 8 generates the urging pressure for pressing the rotor 7 in contact with the stator 6, but, in order to cancel this force, the bearings 14 are provided at three positions in the circumferential direction in the drawing, thereby preventing it from affecting the transmission system. In addition to the above supporting method, another structure using thrust bearing or ball race may be applied though not shown in particular.

When the manual ring 11 is driven by the driving means, the output from the oscillatory-wave motor (6, 7) as a driving source is transmitted as turning force of the output tube 10 through the magnetic coupling means to the manual ring 11. The magnetic coupling means is comprised of the thin plate 16 attached to the output tube 10, the resin magnet 17 attached to the manual ring 11, the yoke plate 19, the resin spacer 18 bonded to the resin magnet 17, etc.

The predetermined hysteresis torque is generated by adjusting the distance between the thin plate 16 and the resin magnet 17. At this time, this hysteresis torque is determined by adjusting the distance by the polarization number of the resin magnet 17, magnetization intensity thereof, or the spacer 18. Further, the friction torque is generated between the thin plate 16 and the resin spacer 18 in accordance with necessary torque 7 to be added to the hysteresis torque, and the total torque is used.

In the present embodiment, the resin spacer 18 is used not only for keeping the distance constant, but also for generating the predetermined friction torque. Although the present embodiment is arranged such that the thin plate 16 is attached to the output tube 10 while the resin magnet 17, yoke plate 19, and resin spacer 18 bonded to the resin magnet 17 are attached to the manual ring 11, the attaching relation may be reversed.

Further, grease or the like may be applied to the sliding portion in order to improve the feeling of manual operation of the manual ring 11. Then rotation of the manual ring 11 is transmitted through the cam hole 11a and connecting pin 12 to the focus barrel 4. AS a result, the focus barrel 4 moves in the optic-axis direction through the helicoid screw threads 2a, 4a, thereby effecting focus adjustment.

In the case of manual drive, the manual ring 11 is rotated manually. At this time, the driving force transmitted from the manual ring 11 to the driving means (6, 7) is limited by slip torque between the thin plate 16 and the spacer 18. Namely, since the driving means (6, 7) utilizing the oscillatory wave cannot be driven backward, the resin magnet 17 and thin plate 16 of the magnetic coupling means slip relative to each other, which permits the focusing operation with good manual feeling.

Even if external force is applied during electrical power drive, the magnetic coupling means does not transmit the load torque over the predetermined load torque, which prevents the overload from acting on the mechanical system. By this, the present embodiment permits the lens unit 3 to be driven by hand and by electrical power without necessitating any switching mechanism between the electrical power drive and the manual drive and with simplifying the mechanism.

In the present embodiment, the elements are set to satisfy $T_L < T_F < T_M$ where $T_L$ is the minimum torque necessary to drive the manual operation means, $T_F$ the maximum torque that the magnetic coupling means can transmit, and $T_M$ the maximum torque that can maintain the stop state against the driving force from the output side of the driving means.

This facilitates the driving operation in the manual drive and in the electrical power drive. In the manual drive the manual ring 11 is rotated by the working torque of $T_L + T_F$.

According to the present embodiment, as described above, when the operation ring is driven by electrical power, the turning torque of the driving means can be transmitted surely to the driven side, and upon manual drive, for example, if the drive means is implemented using one incapable of being driven backward, such as the oscillatory-wave motor, the operation torque of the operation ring is determined by the turning torque (the hysteresis torque and friction torque) generated by the magnetic coupling means and the working torque caused with lens movement of the taking lens.

As a result, the stable turning torque of the magnetic coupling means can be attained, and in addition, any desired turning torque can be obtained by changing the thickness of the spacer. In addition, the driving means can be protected against overload and backward drive of the driven side. Since the structure is very simple and does not require a large space, it can be positioned near the operation ring, which is effective in reducing the size and cost. Use of the ring oscillatory-wave motor as the driving means matches the cylindrical taking lens, and thus the space can be used effectively. Further, the invention achieves such advantages that the backlash does not occur because of the structure, the response is very good, and so on.

Figure 3:
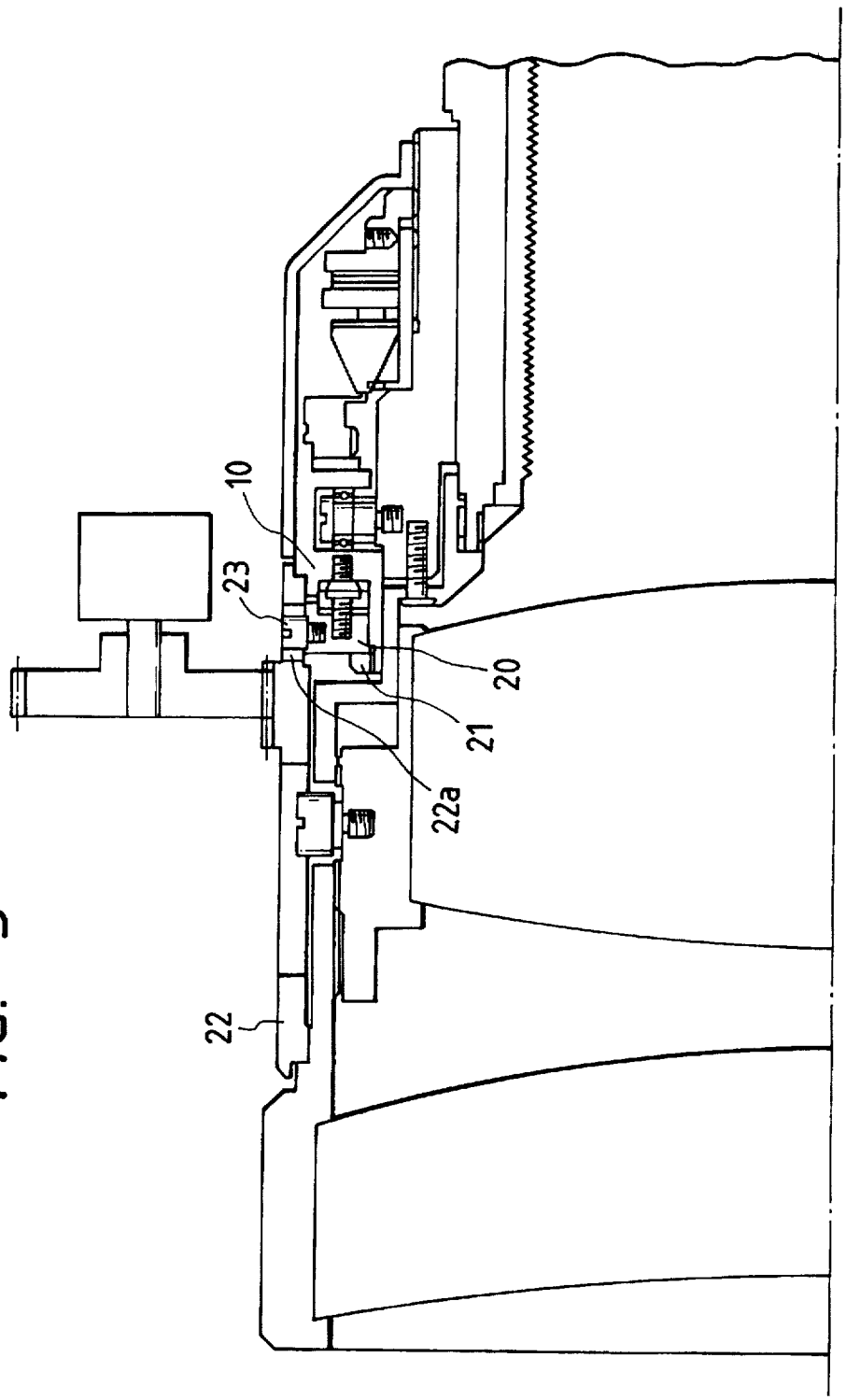
FIG. 3 is a major sectional view of Embodiment 2 of the present invention.

FIG. 3 is a major cross-sectional view of another support mechanism portion of the magnetic coupling means according to the present invention. In the drawing, numeral 20 denotes an output tube after the magnetic coupling means, which is fit to the output tube 10 and which is arranged as freely rotatable. Numeral 21 is a stop ring for stopping slipping-off of the output tube 20, which regulates a motion thereof in the thrust direction. Numeral 22 is a manual ring for focus. Further, 22a is a fitting elongate hole provided in the manual ring 22, and 23 a connecting pin for connecting the output tube 20 with the manual ring 22, which is screwed into the output tube 20.

With rotation of the output tube 10 being the output from the driving means utilizing the oscillatory wave, the output tube 20 rotates in accordance with the slip torque of the magnetic coupling means. This rotation is transmitted through the connecting pin 23 to the manual ring 22. The other structure is the same as in FIG. 1.

Figure 4:
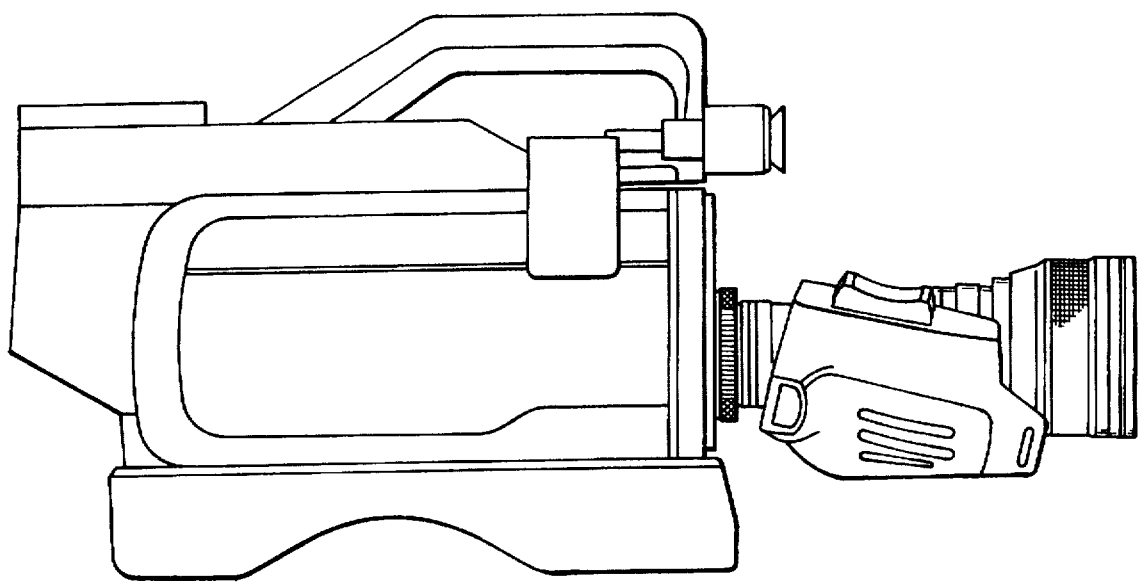
FIG. 4 is an appearance view of an optical apparatus of the present invention.
Figure 5:
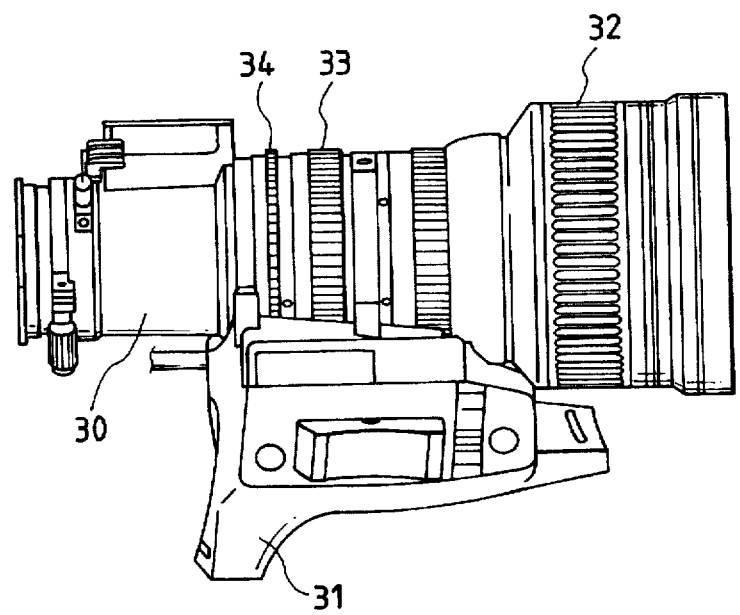
FIG. 5 is an appearance view of a conventional taking lens.
Figure 6:
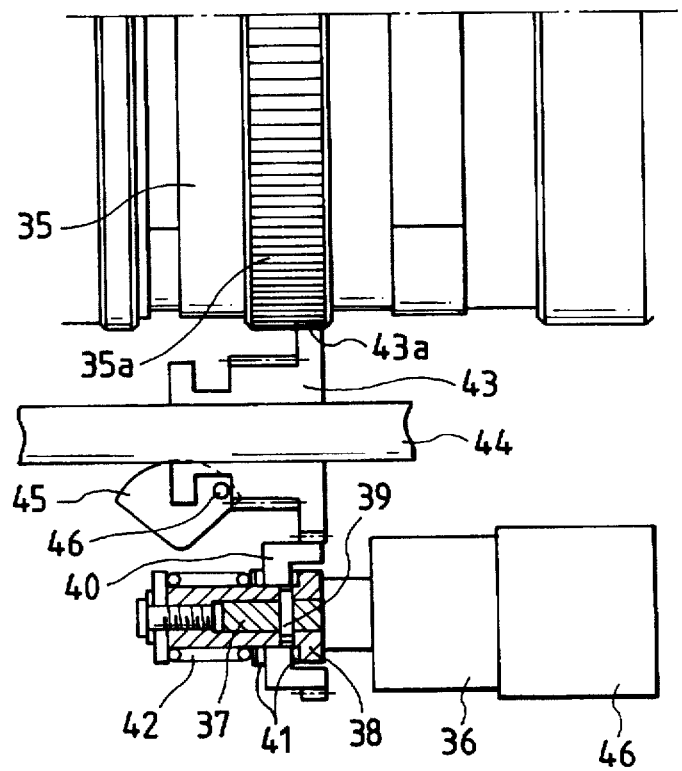
FIG. 6 is a major schematic drawing of a conventional lens barrel.
Figure 7:
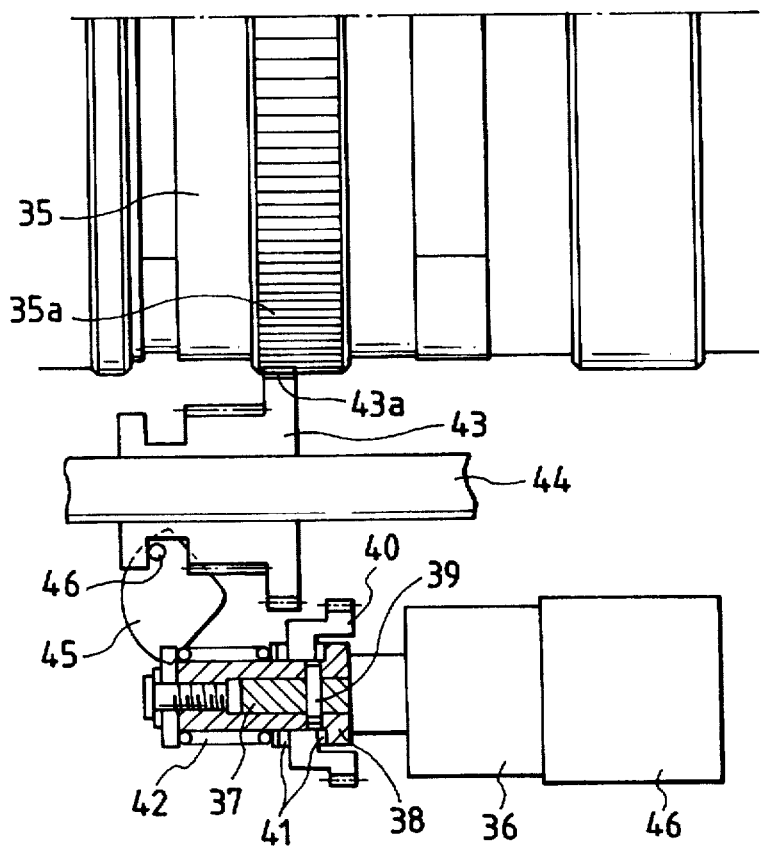
FIG. 7 is a major schematic drawing of the conventional lens barrel.

FIG. 4 is an appearance view when the taking lens mounted with the electrical power transmission mechanism utilizing the magnetic coupling means according to the present invention is mounted in a camera. In the drawing numeral 41 designates the taking lens, 42 a grip, and 43 a drive unit in which the electrical power transmission mechanism is housed. Numeral 44 is the camera body, inside of which an image pickup means for recording an object image formed by the taking lens 41 is set.

The present invention, as described above, can achieve the optical apparatus that, in driving the optical means held in the housing by manually driving the operation ring or in driving it with the electrical power transmission mechanism arranged to transmit the turning electrical power generated by the electric motor to the optical means, can decrease the backlash by properly arranging the electrical power transmission mechanism, can reduce the time lag before start of operation of lens unit, and can simplify the structure of the torque limiter mechanism for limiting the transmission torque upon overload rotation, thereby simplifying the entire apparatus and reducing its size.

What is claimed is:

1. An optical apparatus comprising:

an optical lens unit;

manual operation means for operating said optical lens unit manually; and drive means for driving said optical lens unit by electrical power, wherein said manual operation means and said drive means are coupled with each other by magnetic force.

2. The optical apparatus according to claim 1, wherein said drive means has a first thin plate having magnetic force, said manual operation means has a second thin plate having magnetic force, and said first and second thin plates are coupled with each other by the magnetic force.

3. The optical apparatus according to claim 2, wherein said first and second thin plates both are of an annular shape.

4. The optical apparatus according to claim 2, wherein when said manual operation means is operated manually, said second thin plate slips relative to said first thin plate.

5. The optical apparatus according to claim 2, wherein when driven by said drive means, said optical lens unit is driven as said first and second thin plates are kept coupled.

6. The optical apparatus according to claim 2, wherein a spacer is disposed between said first and second thin plates.

* * * * *

UNITED STATES PATENT AND TRADEMARK OFFICE
CERTIFICATE OF CORRECTION

PATENT NO. : 5,731,919
DATED : March 24, 1998
INVENTOR(S) : Yamamoto

It is certified that error appears in the above-identified patent and that said Letters Patent is hereby corrected as shown below:

COLUMN 3:

Line 15, "room" should read --space--.

COLUMN 4:

Line 14, "Generates" should read --generates--.

COLUMN 5:

Line 19, "reduce" should read --reduces--.

COLUMN 6:

Line 16, "AS" should read --As--.

COLUMN 7:

Line 27, "drawing" should read --drawing,--.

Signed and Sealed this

Twentieth Day of October, 1998

Attest:

BRUCE LEHMAN

Attesting Officer      Commissioner of Patents and Trademarks